US006962256B2

(12) United States Patent
Nguyen et al.

(10) Patent No.: US 6,962,256 B2
(45) Date of Patent: Nov. 8, 2005

(54) PLASTIC MOLDED CENTER TUBE ASSEMBLY

(75) Inventors: Ledu Quoc Nguyen, Fayetteville, NC (US); Allen Buhr Wright, Hope Mills, NC (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/445,498

(22) Filed: May 27, 2003

(65) Prior Publication Data

US 2004/0238437 A1 Dec. 2, 2004

(51) Int. Cl.$^7$ .............................................. B01D 27/06
(52) U.S. Cl. ..................... 210/440; 210/457; 210/493.1
(58) Field of Search ................................ 210/437, 440, 210/457, 458, 483, 488, 489, 493.1, 493.2, 497.01; 55/521; 29/428; 428/36.9, 66.6, 66.7

(56) References Cited

U.S. PATENT DOCUMENTS

| | | | |
|---|---|---|---|
| 4,105,562 A | | 8/1978 | Gaba et al. |
| 5,601,711 A | | 2/1997 | Sklar et al. |
| 5,601,717 A | * | 2/1997 | Villette et al. ........... 210/493.1 |
| 5,906,737 A | * | 5/1999 | Hoeppner ................... 210/232 |
| 6,511,101 B1 | | 1/2003 | Sommer et al. |
| 6,615,990 B1 | * | 9/2003 | Jokschas et al. ............ 210/457 |

FOREIGN PATENT DOCUMENTS

| | | |
|---|---|---|
| DE | 1 902 534 | 10/1964 |
| DE | 28 11 943 A1 | 9/1979 |
| EP | 0 769 317 A1 | 4/1997 |
| GB | 1 441 269 | 6/1976 |

OTHER PUBLICATIONS

European Search Report, Sep. 8, 2004, Application No. EP 04253067.

* cited by examiner

*Primary Examiner*—Matthew O. Savage
(74) *Attorney, Agent, or Firm*—Carlson, Gaskey & Olds

(57) ABSTRACT

A filter for a fluid system includes a housing having an interior cavity. A filter media is disposed in the housing and defines a central opening. A center tube assembly is arranged within the central opening and includes discs which are stackable upon one another. Each disc includes a central portion having base received by an inner wall of the central portion of the adjacent disc. An outer portion extends radially outwardly from the central portion and is positioned adjacent to the filter media. The central portion, base, and outer portion may include openings to permit the flow of fluid through the center tube assembly. The center tube assembly provides the desired structural integrity while permitting fluid to flow through the center tube. The present invention center tube assembly may be produced by a plastic molding process.

7 Claims, 3 Drawing Sheets

PLASTIC MOLDED CENTER TUBE ASSEMBLY

BACKGROUND OF THE INVENTION

This invention relates to a filter for use in fluid systems, and more particularly, the invention relates to a center tube commonly used in filters.

Filters are typically constructed from a housing of one or more components secured to one another. A filter media, which is typically a pleated type filter media, is disposed within the interior cavity of the housing. The filter media is typically cylindrical in shape with the exterior of the filter media defining an input side through which dirty fluid enters. The interior of the filter media defines an outlet side that receives the clean fluid.

A center tube is typically arranged centrally within the filter relative to the filter media to hold the shape of the filter media and provide strength to the filter. The center tube is typically constructed from metal. Center tubes of different diameters and lengths are produced for various sized filters. As a result, a high inventory of center tubes is required for the different filters. Furthermore, numerous individual dies, rollers and sealing equipment are required for producing each of the center tubes for the various filters.

Therefore, what is needed is a center tube that permits the flow of fluid therethrough while being able to accommodate different diameters and lengths needed for the various filters.

SUMMARY OF THE INVENTION AND ADVANTAGES

A filter for a fluid system includes a housing having an interior cavity. A filter media is disposed in the housing and defines a central opening. A center tube assembly is arranged within the central opening and includes discs which are stackable upon one another. Each disc includes a central portion having base received by an inner wall of the central portion of the adjacent disc. An outer portion extends radially outwardly from the central portion and is positioned adjacent to the filter media. The central portion, base, and outer portion may include openings to permit the flow of fluid through the center tube assembly. The center tube assembly provides the desired structural integrity while permitting fluid to flow through the center tube. The present invention center tube assembly may be produced by a plastic molding process.

Accordingly, the above provides a center tube that permits the flow of oil therethrough while being able to accommodate different diameters and lengths needed for the various filters

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
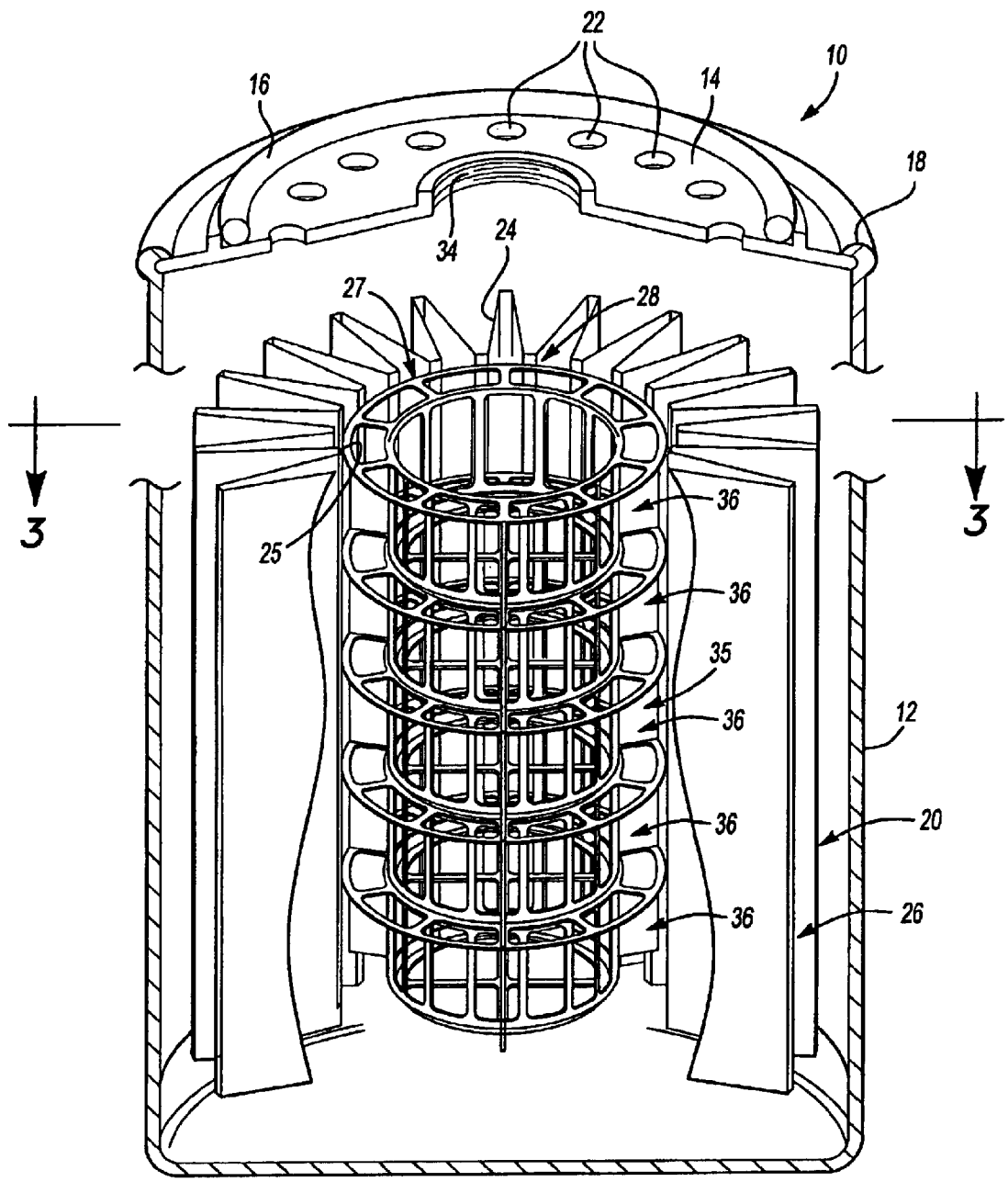
FIG. 1 is a partial cross-sectional perspective view of the present invention filter.

A filter 10, shown in FIG. 1, is typically used for filtering fluid such as in a lubrication system for an engine. The filter 10 includes a can or housing 12 that may be constructed from one or more components secured to one another. For example, a nut plate 14 may be secured to an outer cylindrical wall portion with a seam 18. An O-ring 16 is placed on the nut plate 14 to seal between the filter 10 and a mounting adaptor (not shown).

The filter 10 includes an interior cavity 20 with a filter media 24 disposed within the cavity interior 20 to filter debris from the fluid so that clean fluid may be returned to the engine, such as for lubrication of engine components. The filter media 24 may be of a generally cylindrical shape and is typically pleated to form inner edges 25 that define a central opening 27. The filter media 24 is typically retained between end caps, which are not shown for clarity. The filter media 24 has an inlet side 26 that receives dirty fluid and an outlet side 28 where clean fluid exits the filter media 24. The nut plate 14 may include perforations 22 to permit dirty fluid to enter the filter 10. Nut plate 14 may also include a threaded aperture 34 that is used to secure the filter 10 to the mounting adaptor. The clean fluid exits the central opening 27 through the threaded aperture 34 and into the mounting adaptor.

It should be understood that the fluid flow may be reversed from that described above. Furthermore, the present invention center tube assembly may also be used with a cartridge type filter typically located within a suitable fixed housing. The filter media is retained between spaced apart end discs, such that the outer perimeter of the filter media is left exposed. Such a filter arrangement is well known in the art. Moreover, it is to be understood that the present invention center tube assembly, discussed below, may be used in any suitable filter configuration.

Figure 2:
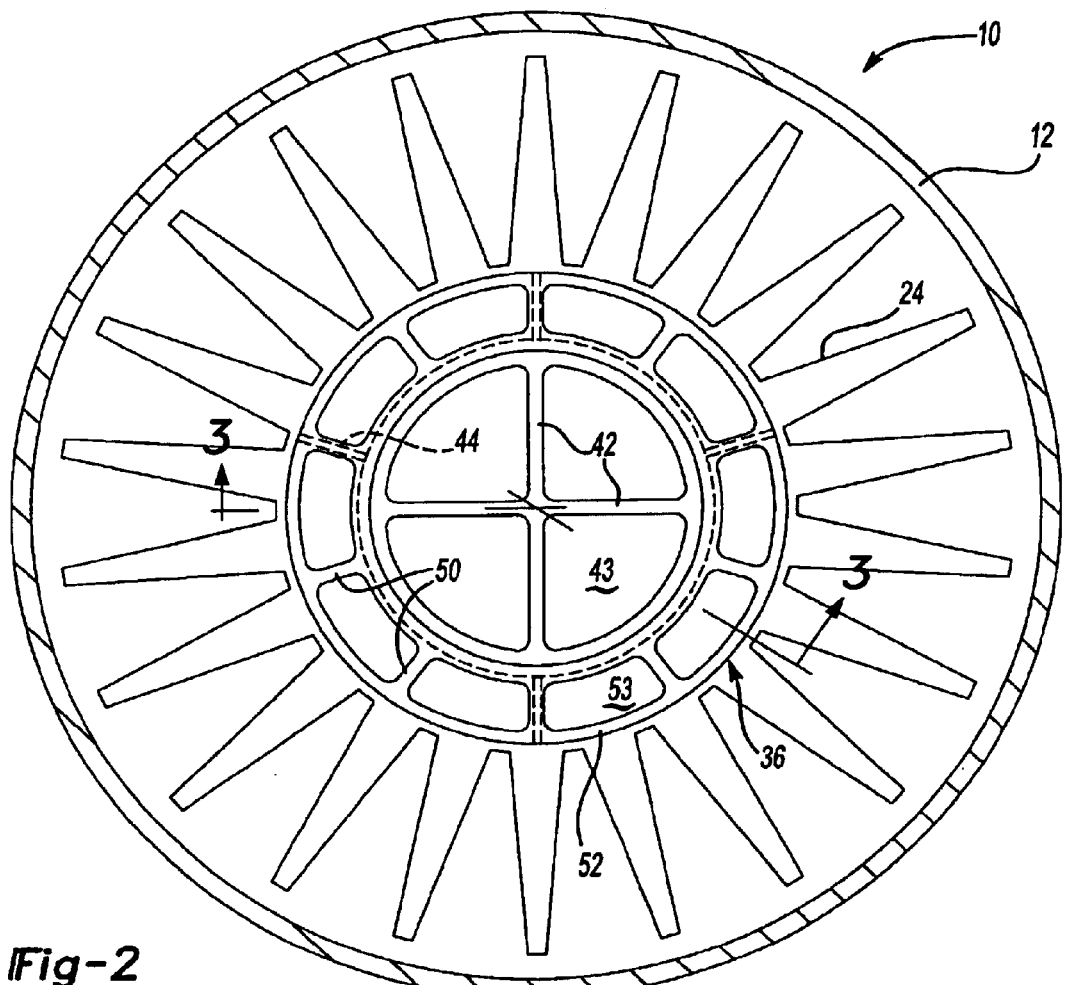
FIG. 2 is a top view of the filter shown in FIG. 1.
Figure 3:
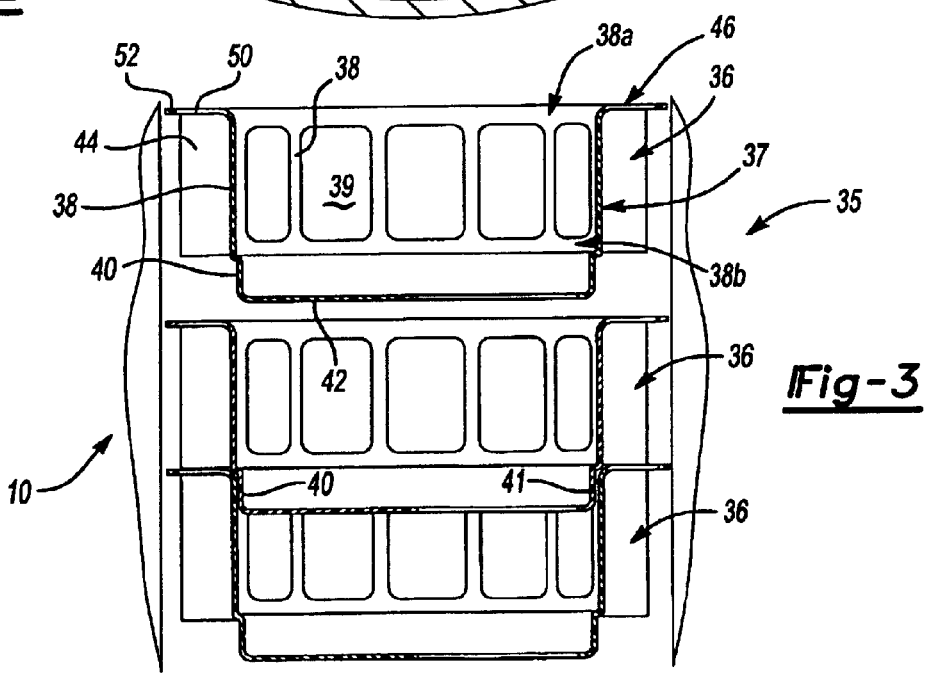
FIG. 3 is a cross-sectional view of the filter shown in FIG. 2 taken along lines 3—3.
Figure 4:
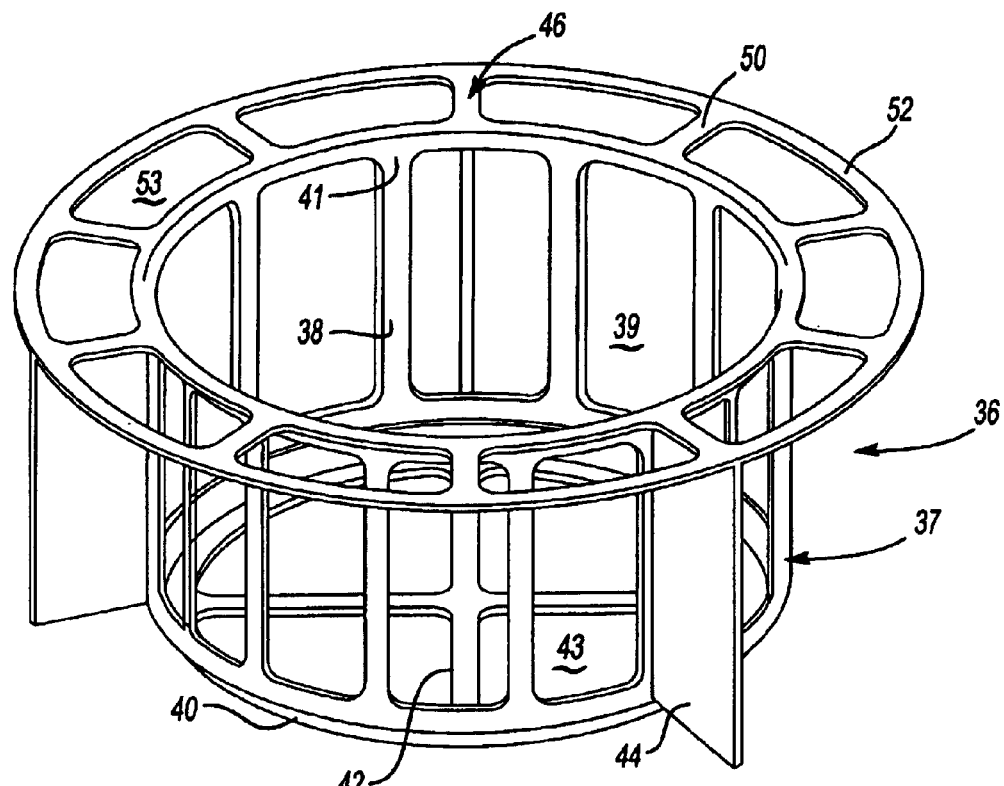
FIG. 4 is a side perspective view of one of the discs of the center tube assembly shown in FIG. 3.

A center tube assembly 35 is disposed within the central opening 27 to provide structural integrity to the filter 10 and permit fluid to pass through the center tube assembly 35 to the mounting adaptor. The center tube assembly 35 is arranged proximate to the filter media 24 to provide support to its inner edges 25 to maintain the shape of the filter media 24. The center tube assembly 35 includes discs 36 that are stacked to a desired height. Referring to FIGS. 2–4, the center tube assembly 35 includes a central portion 37 that may be any desirable shape. The central portion 37 may include spaced apart vertical walls 38 defining openings 39. The central portion 37 includes a first imperforate tubular portion 38a joined to an outer portion 46, a second imperforate tubular portion 38b that is axially spaced from the first imperforate tubular portion, and a plurality of axially extending circumferentially spaced apart vertical walls 38 having opposite axial ends connected to respective ones of the first and second imperforate tubular portions 38a, 38b for defining spaced apart first openings 39. A plurality of fins 44 extend axially and radially outwardly from radially outermost surfaces of the first and second imperforate tubular portions 38a, 38b and the vertical walls 38 toward the filter media 24. The central portion 37 further includes a base 40 that is indented or recessed radially from the vertical walls 38 and is received by an inner wall 41 of the adjacent disc 36. The base 40 includes arms 42 extending between the vertical walls 38 to provide structural rigidity. The arms 42 define openings 43 to permit the flow of fluid therethrough. An outer portion 46 may extend radially outwardly from the central portion 37. The outer portion 46 includes an annular wall 52 connected to the central portion 37 by legs 50. The legs 50, annular wall 52, and central portion 37 define openings 53 that permit the flow of fluid therethrough. Fins 44 may be interconnected between the central portion 37 and the outer portion 46 to provide additional structural rigidity to the discs 36.

Figure 5:
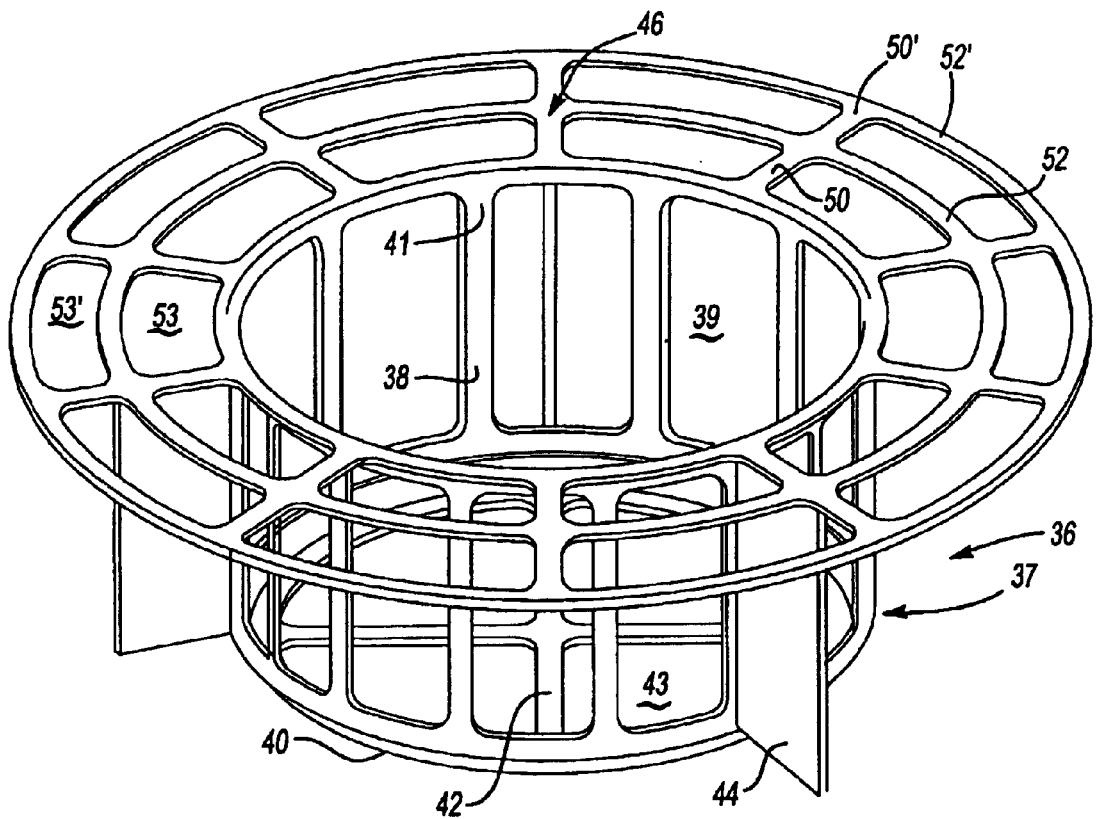
FIG. 5 is a side perspective view of a disc similar to that shown in FIG. 4 with an extended outer portion.

The length of the central portion 37 may be varied to provide different length discs 36 suitable for multiple filters. Moreover, a combination of discs 36 having different length central portions 37 may be used to achieve a desired length of the center tube assembly 35. Similarly, different size outer portions 46 may also be used to provide various diameters of the center tube assembly 35, as best shown in FIG. 5.

Preferably, the center tube assembly 35 of the present invention is constructed from a plastic. The center tube assembly 35 may be produced by a molding process. A dedicated mold may be used to produce a disc having a defined central portion length and outer portion diameter. Various molds may be used to provide sets of various sized discs that may be mixed or matched to provide a center tube assembly of a desired length and diameter. A mold may contain various inserts to provide different length central portions 37 and different diameters of die outer portion 46 so that only one mold may be needed, as will be appreciated of one of ordinary skilled in the art. Furthermore, the disc 36 shown in FIG. 5 may be trimmed to provide a disc 36 of the diameter shown in FIG. 4 so that one mold may provide discs of different diameters. Alternatively, a more versatile mold may be used having inserts to vary the central portion length and outer portion diameter, as would be appreciated by one of ordinary skilled in the art.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A filter for a fluid system comprising:
   a housing having an interior cavity;
   a filter media disposed in said interior cavity and defining a central opening; and
   a center tube assembly disposed in said central opening and including first and second discs stacked together with said first and second discs terminating in an outer portion adjacent to said filter media, said discs each including a central portion, said central portion including first imperforate tubular portion joined to said outer portion, a second imperforate tubular portion that is axially spaced from said first imperforate tubular portion, a plurality of axially extending circumferentially spaced apart vertical walls having opposite axial ends connected to respective ones of said first and second imperforate tubular portions for defining spaced apart first openings, and a plurality of fins extending axially and radially outwardly from radially outermost surfaces of said first and second imperforate tubular portions and said vertical walls toward said filter media.

2. The filter according to claim 1, wherein said filter media is pleated forming inner edges proximate to said outer portion.

3. The filter according to claim 1, wherein said filter media includes inlet and outlet sides with said center tube assembly disposed on said outlet side.

4. The filter according to claim 1, wherein said fins extend axially to support said outer portion.

5. The filter according to claim 4, wherein said outer portion includes an annular wall connected to said central portion by legs, and said legs, said annular wall, and said central portion defining second openings.

6. The filter according to claim 4, wherein said central portion of one of said first and second discs includes a base indented from said vertical walls and received by an inner wall of said central portion of the other of said first and second discs.

7. The filter according to claim 6, wherein said base includes third openings provided by intersecting arms, said base being arranged at one end of each of said first and second discs and said outer portion being arranged at the other end of each of said first and second discs.

* * * * *